United States Patent [19]

Haug et al.

[11] Patent Number: 4,710,857
[45] Date of Patent: Dec. 1, 1987

[54] HEADLIGHT-BLINKING LIGHT UNIT FOR PASSENGER CARS

[75] Inventors: Kurt Haug, Reutlingen; Rudolf Peterssen, Kusterdingen, both of Fed. Rep. of Germany

[73] Assignee: Robert Bosch GmbH, Stuttgart, Fed. Rep. of Germany

[21] Appl. No.: 856,785

[22] Filed: Apr. 28, 1986

[30] Foreign Application Priority Data

May 9, 1985 [DE] Fed. Rep. of Germany ....... 3516711

[51] Int. Cl.⁴ .............................................. B60Q 1/26
[52] U.S. Cl. ......................................... 362/80; 362/61; 362/236
[58] Field of Search ....................... 362/61, 80, 83, 236

[56] References Cited

U.S. PATENT DOCUMENTS 2,106,992 2/1938 Baho ...................................... 362/83
4,251,103 2/1981 Nakajima et al. .................... 296/195

FOREIGN PATENT DOCUMENTS 2656755 6/1978 Fed. Rep. of Germany .
54-45986 4/1979 Japan ...................................... 362/83
2088543A 6/1982 United Kingdom .................. 362/61
2093174A 8/1982 United Kingdom .................. 362/61

Primary Examiner—Samuel Scott
Assistant Examiner—Allen J. Flanigan
Attorney, Agent, or Firm—Michael J. Striker

[57] ABSTRACT

A headlight-blinking light unit for passenger vehicles having a vehicle body with a trough, the unit comprises a headlight, a blinking light, a headlight housing arrangeable in a trough of the vehicle body and mountable in the same, a blinking light housing displaceable on the headlight housing parallel to the longitudinal axis of the vehicle, elements for mounting the blinking light housing in its operational position on the headlight housing, the blinking light housing being provided with at least one spring element which abuts against an inner side of the body and presses the blinking light against an outer side of the body.

9 Claims, 3 Drawing Figures

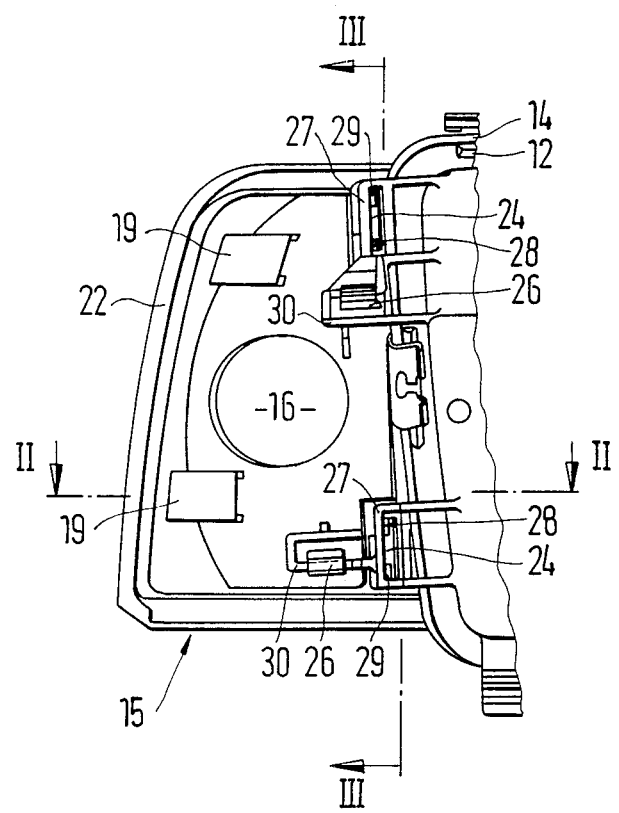

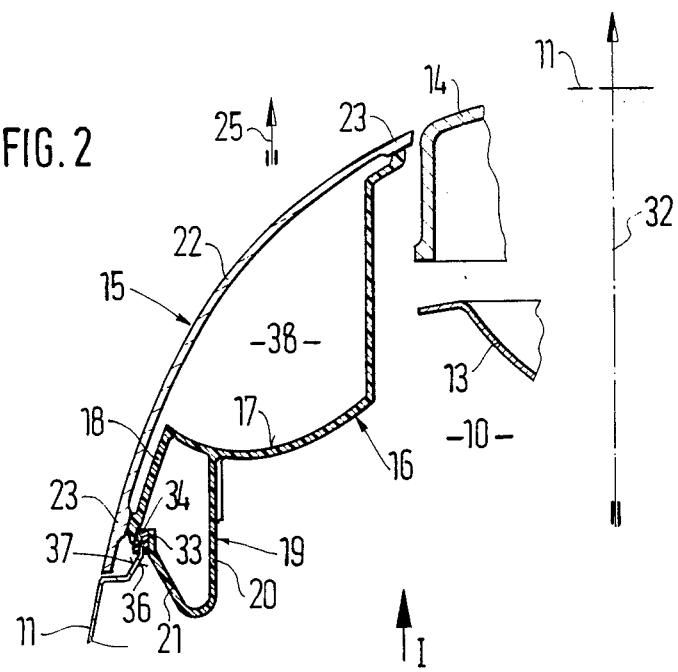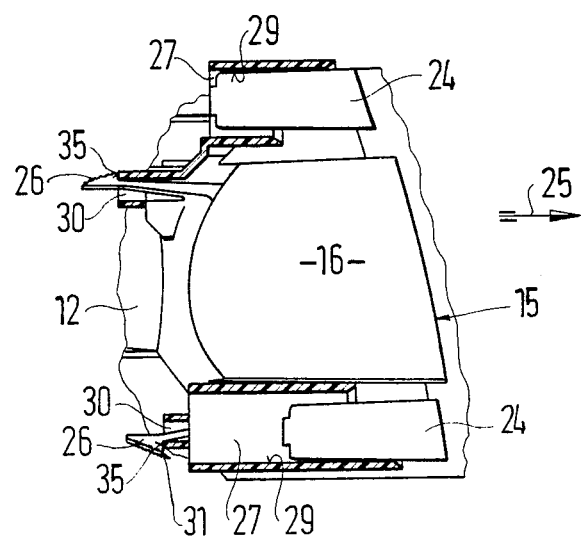

HEADLIGHT-BLINKING LIGHT UNIT FOR PASSENGER CARS

BACKGROUND OF THE INVENTION

The present invention relates to a headlight-blinking light unit for passenger cars.

More particularly, it relates to such a unit in which a headlight housing is arranged in a trough of the vehicle body and mounted on the same, and a blinking light housing which is displaceable parallel to the longitudinal axis of the car on the headlight housing and connected with the latter by means of respective elements in its operational position.

Units of the above mentioned general type are known in the art. One of such units is disclosed, for example, in the German document DE-OS No. 2,656,755. Here, the blinking light housing is connected by respective elements to a neighboring headlight, on the one hand, and pressed against the wheel box of the car body in a spring-elastic manner, on the other hand. This construction possesses the disadvantage that the lateral outer portion of the blinking light cannot be lifted from the wheel box and can no longer assume its initial operational position, so that the blinking signal does not proceed in the predetermined direction.

SUMMARY OF THE INVENTION

Accordingly, it is an object of the present invention to provide a headlight-blinking light unit of the above mentioned general type which avoids the disadvantages of the prior art and solves the above discussed problem.

In keeping with these objects and with others which will become apparent hereinafter, one feature of the present invention resides, briefly stated, in that a blinking light housing has at least one spring element which is supported on an inner side of a body, and the blinking light, in particular its lateral outer portion, is pressed against an outer side of the body.

When the unit is designed in accordance with the above mentioned features, in critical region of the lateral outer portion of the blinking light, additionally a spring force for force-transmitting and thereby play-free positioning of the blinking light is provided.

In accordance with another feature of the present invention, the blinking light is composed of a synthetic plastic material, the spring element is formed as a curved leaf spring with two legs, and one leg projects from a rear side of the light housing, whereas the other leg is supported on the inner side of the body.

Still a further feature of the present invention is that the elements for mounting of the blinking light housing on the headlight housing are formed as a spring arm which projects from the light housing and acts horizontally so that with the cooperation with a shoulder of the headlight housing the lateral arrangement of both housings takes place, on the one hand, and a spring hook which extends from the light housing and acts vertically interengages with an edge of the headlight housing to provide the arrangement of both housings in the traveling direction. When these features are implemented, a technically simple way is provided to associate the blinking light in three directions of the headlight.

This association is further increased when in accordance with a further feature of the present invention the blinking light housing has two spring arms, the headlight housing has two pockets and each pocket has a shoulder cooperating with the spring arm, and the sliding surface for the spring arm is provided for the vertical arrangement of both housings. The blinking light housing has two spring hooks, and the headlight housing has a first and a second edge each engaging the supporting surface of the spring hook.

Finally, the supporting surface of the spring hook which engages the edge is formed spherically in a horizontal direction. With a maximum spring path of the spring element, a line contact of the spring hook with the headlight housing is obtained in this construction.

The novel features which are considered as characteristic for the invention are set forth in particular in the appended claims. The invention itself, however, both as to its construction and its method of operation, together with additional tional objects and advantages thereof, will be best understood from the following description of specific embodiments when read in connection with the accompanying drawings.

BRIEF DESCRIPTION OF THE DRAWING

FIG. 1 is a rear view of a blinking light which is mounted on a headlight housing, as seen in a blinking direction I in FIG. 2;

FIG. 2 is a view showing a horizontal section taken along the line II—II in FIG. 1; and FIG. 3 is a view showing a vertical section taken along the line III—III in FIG. 1.

DESCRIPTION OF THE PREFERRED EMBODIMENTS

A headlight-blinking light unit for passenger power vehicles, such as passenger cars is arranged in a trough 10 of a vehicle body 11 on which a headlight housing 12 is mounted. The headlight housing 12 supports a headlight reflector 13 and a dispersion disc 14. A light disc 22 closes an inner chamber 38 of a blinking light 15. It is welded with a continuous edge 23 of a blinking light housing 16.

The blinking light housing 16 of the blinking light 15 is composed of synthetic plastic material and has a light reflector 17. A lateral outer portion projects from the light reflector 17 and is formed as a tongue 18. A curved leaf spring 19 acts as a spring element. Its one leg 20 is formed of one piece with the rear side of the blinking light housing 16, and its second leg 21 which serves as a spring blade extends laterally outwardly and is supported via a sealing piece 34 against the lateral inner side 36 of the body 11. The sealing piece 34 is fitted on an edge 33 of the body 11.

Two spring arms 24 are arranged on the blinking light housing 16 and extend parallel to a longitudinal axis 32 of the vehicle and above one another. The spring arms 24 act in a horizontal direction. Two vertically acting spring hooks 26 are arranged on the blinking light housing 16 and each is provided with supporting surface 31 which is spherical in a horizontal direction. Two pockets 27 each having a shoulder 28 and a sliding surface 29, and two pockets 30 each provided with an edge 35 project from the blinking headlight housing 12 parallel to the longitudinal axis 32 and opposite to the travelling direction which is identified with the arrow 25.

The headlight-blinking light unit for a passenger car is assembled as follows for subsequent mounting on the body 11. The blinking light 15 is displaced against the travelling direction 25 and parallel to the longitudinal axis 32 on the headlight housing 12 so that each spring arm 24 by abutting against the shoulder 28 provides the lateral arrangement and by abutting against the sliding surface 29 provides for the vertical arrangement of both housings 12 and 16. At the end of the displacement the blinking light housing 16 leans on the headlight housing 12 in a not shown manner and the supporting surface 31 of the spring hook 26 engages the edge 35 of the pocket 30, so that the operational position of the blinking light 15 in the travelling direction 26 is guaranteed.

The free leg 21 of both leaf springs 19 supports via the sealing piece 34 on the inner side 36 of the body 11 and presses the tongue 16 of the blinking light housing 16 on the outer side 37 of the body 11. Thereby, a lifting of the lateral outer portion 18 of the blinking light 15 is prevented.

It will be understood that each of the elements described above, or two or more together, may also find a useful application in other types of constructions differing from the types described above.

While the invention has been illustrated and described as embodied in a headlight-blinking light unit for passenger vehicles, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A headlight-blinking light unit for passenger vehicles having a vehicle body, with a trough, the unit comprising a headlight; a blinking light; a headlight housing arrangeable in a trough of the vehicle body and mountable in the same, said headlight housing having a shoulder and an edge; a blinking light housing displaceable on said headlight housing parallel to the longitudinal axis of the vehicle; means for mounting said blinking light housing in its operational position on said headlight housing, said blinking light housing being provided with at least one spring element which abuts against an inner side of the body and presses said blinking light against an outer side of the body, said means for mounting said blinking light housing on said headlight housing including a horizontally acting spring arm which projects from said blinking light housing and cooperates with said shoulder of said headlight housing for providing a lateral arrangement of said blinking light housing and said headlight housing, and a vertically acting spring hook which projects from said blinking light housing and engages said edge of said headlight housing for providing an arrangement of said blinking light housing and said headlight housing in a travelling direction.

2. A unit as defined in claim 1, wherein said blinking light has a lateral outer portion, said spring element being formed so as to press said lateral outer portion of said blinking light against the outer side of the body.

3. A unit as defined in claim 1, wherein said blinking light housing is composed of a synthetic plastic material, said spring element being formed as a curved leaf spring having two legs, one of said legs of said flat spring projecting from a rear side of said blinking light housing, while the other leg of said leaf spring abuts against the inner side of the body.

4. A unit as defined in claim 3, wherein said blinking light has a blinking light reflector which is formed of one piece with said blinking light housing, said lateral outer portion of said blinking light being formed as a tongue which projects on said blinking light reflector.

5. A unit as defined in claim 4; and further comprising a sealing piece inserted between said tongue and said other leg which abuts against the inner side of the body.

6. A unit as defined in claim 5, wherein the body has an edge, said sealing piece being formed so that it is fittable on the edge of the body.

7. A unit as defined in claim 4, wherein said blinking light housing has two such spring arms, said headlight housing having two pockets each provided with said shoulder cooperating with respective one of said spring arms and also provided with a sliding surface for said spring arms for a vertical arrangement of said blinking light housing and said headlight housing.

8. A unit as defined in claim 7, wherein said blinking light housing has two such spring hooks provided with a supporting surface, said headlight housing having a first and a second edge each engaging with said supporting surface of a respective one of said spring hooks.

9. A unit as defined in claim 7, wherein said supporting surface of said spring hook is formed spherically in a horizontal direction.

* * * * *